United States Patent Office 3,443,320
Patented May 13, 1969

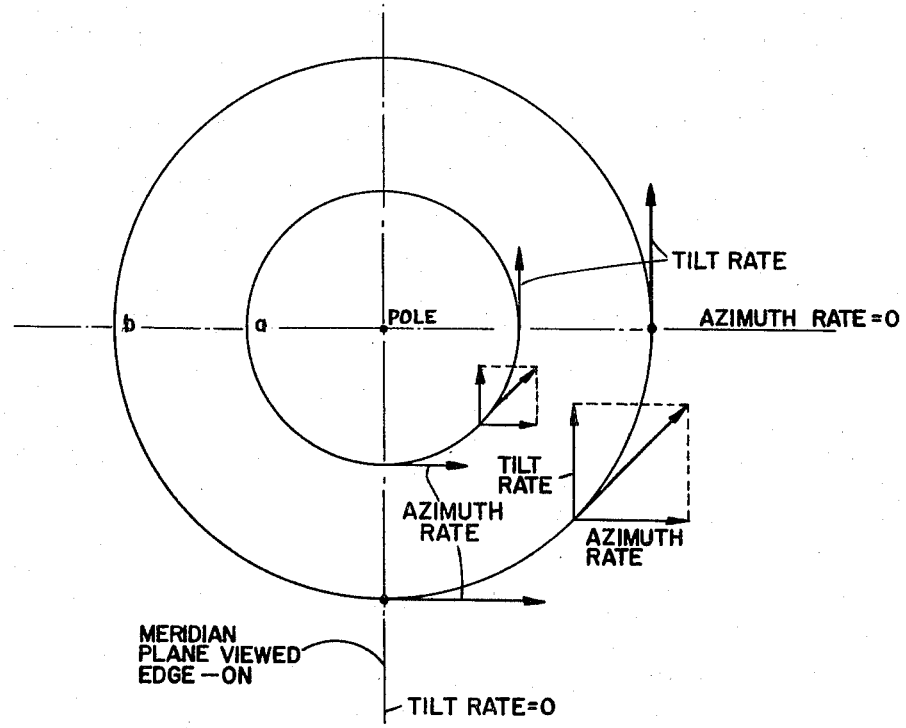
FIG. I
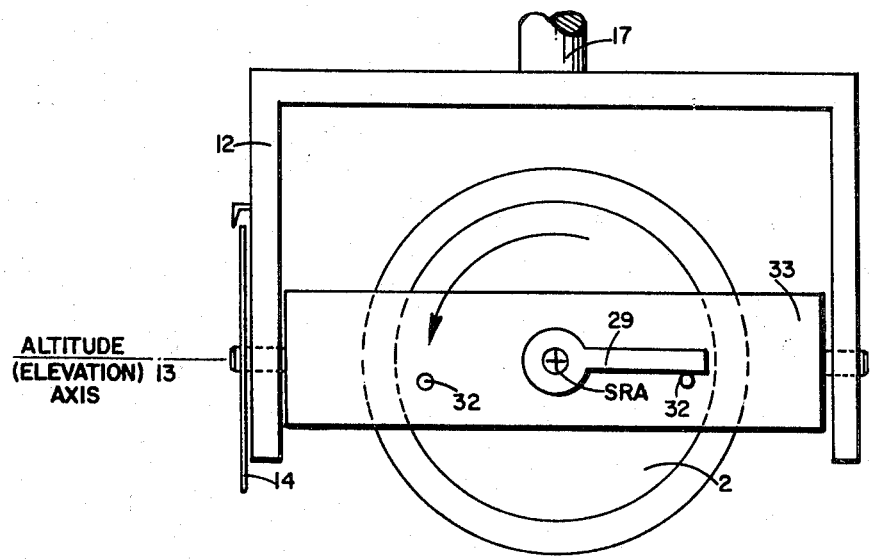
FIG. 4
INVENTORS
JOSEPH C. BOLTINGHOUSE
JOHN M. SLATER
BY
ATTORNEY

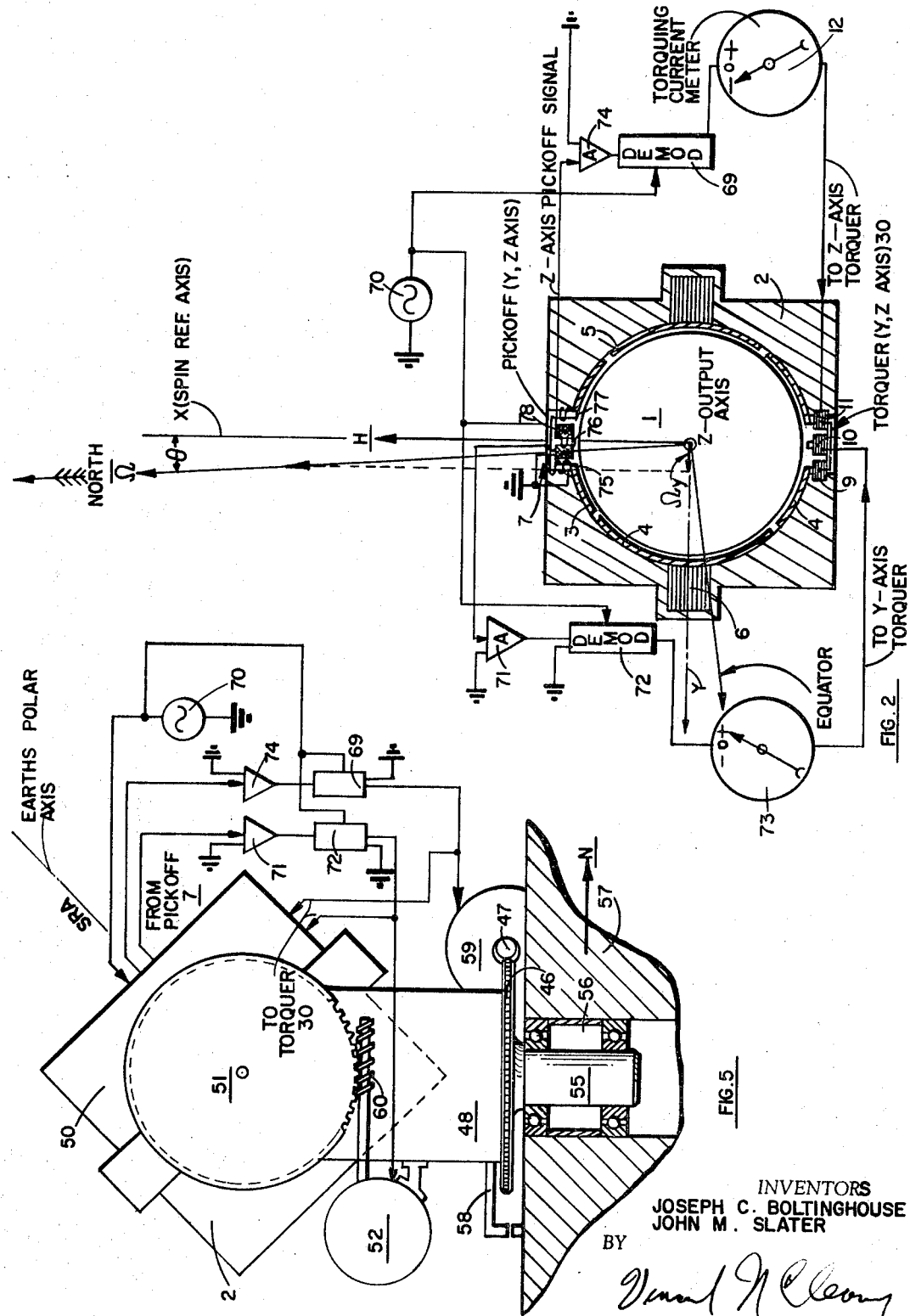

3,443,320
ELECTROSTATIC GYROCOMPASS
Joseph C. Boltinghouse, Whittier, and John M. Slater, Fullerton, Calif., assignors to North American Rockwell Corporation
Filed Sept. 21, 1964, Ser. No. 398,000
Int. Cl. G01c 19/38, 19/40
U.S. Cl. 33—226          6 Claims

ABSTRACT OF THE DISCLOSURE

An electrostatic gyro having its spin reference axis meriodionally aligned by manually or automatically orienting it to minimize the indicated or signaled rotor torquing current necessary to align the spin with the spin reference axis. Alternatively, the gyro may be started up with the spin axis displaced from the polar axis, with the spin reference axis servoed to follow it in describing a cone about the polar axis as the earth rotates. A pick-off and indicator of its departure in tilt from a preset elevation reads zero at two azimuths along the cone, and their mean establishes the meridian.

---

This invention relates to direction determining apparatus, and in particular to gyrocompasses for measuring directions in azimuth. The invention further relates to gyrocompasses based on free rotor gyros, especially of the electrostatically supported type whose extremely high potential accuracy recommends it for gyrocompass use. It will be understood that some present-day gyrocompass applications require finding the meridian to an accuracy of a few seconds of arc which corresponds to gyro drift rates in the range $10^{-3}$ to $10^{-4}$ deg./hr. Obtaining such accuracy is beyond the capability of most conventional gyros. The problem is aggravated by the fact that operation at high latitudes, as in Alaska and Canada, is required for military purposes.

In the present state-of-the-art there are three known methods for primary determination of azimuth directions, namely the magnetic compass, celestial observations, and gyrocompasses. Magnetic compasses do not provide the required accuracy because of large local declination anomalies, and even excessive diurnal variations in declination at a given location. Celestial observation is a fundamental means for determining direction, but it is a very time consuming process for any degree of accuracy required. Additional limitations on this method are that the time must be accurately known and further that the skies must be clear. Present-day commercial gyrocompasses, even under ideal conditions, do not have the required degree of accuracy. The usefulness of these present-day gyrocompasses is further limited in that the ideal operating conditions require an extremely long period of warmup, as much as a working day. These gyroscopes are so large as not to be portable in any reasonable sense of the term.

In general, a gyrocompass is an apparatus for establishing a meridian reference by locating the earth's rotation axis by gyroscopic means. The operation of a gyroscope depends on the ability to sense absolute angular velocity, i.e., angular velocity in inertial space. A gyroscope mounted on the rotating earth will have an output depending on its orientation relative to the earth's axis. The gyroscope will produce an output signal due to the earth's rotation rate unless its sensing or reference axis lies parallel to the equatorial plane of the earth. If the gyroscope has zero signal output at the same time that its sensing axis is constrained to be horizontal, then the sensing or input axis must be along an east-west line.

A gyrocompass for precisely measuring directions in azimuth and earth latitude is described in U.S. Patent No. 2,972,195, issued Feb. 21, 1961, to M. E. Campbell, et al. for "Gyrocompass," and assigned to North American Aviation, Inc., the assignee of this invention. The device described in that patent uses a single degree of freedom gyroscope with an output axis pickoff, the output of which is used to control an output axis torquer. The gyroscope case is adjustable in azimuth. When the input axis is not aligned with the east-west line, a torquing current is present which drives the torquer to keep the pickoff at a null position. In establishing the east-west line, the gyroscope case is adjusted in azimuth until the torquing current is minimum. There will be a minimum torquing current only when the input axis is aligned with an earth horizontal east-west line as this is the position in which the earth imparts a minimum rotation rate about the input axis of the gyroscope.

In the gyro pendulum type of compass such as the Meridianweiser (see U.S. Patent No. 3,001,290, issued Sept. 26, 1961, to O. Rellensmann, et al., for "Gyroscopic Compass") the gyro, likewise having a journal-bearing rotor, is suspended in a manner allowing two degress of freedom while permitting the pendulous moment to act on the rotor via the axle.

Since the free rotor gyro has no mechanical support or axle, neither of these methods can be used with it. Special methods had to be devised and these are the subject of the present invention.

Accordingly, it is an object of this invention to provide a gyrocompass which is fundamentally capable of an accuracy comparable with celestial alinement equipment.

It is another object of this invention to provide an improved azimuth direction measuring device.

It is still another object of this invention to provide a gyrocompass having a degree of accuracy heretofore unknown.

It is another object of this invention to provide a gyrocompass having the same sort of portability as regards size and weight, independence from power lines, etc., as ordinary surveying equipment.

A further object of this invention is to provide a highly accurate azimuth direction measuring apparatus operative without regard to location or time of day.

It is another object to provide an improved latitude determining apparatus.

These and other objects will become more apparent by a study of the following detailed description taken in connection with the accompanying drawings in which:

FIG. 1 illustrates the trace of the rotor spin axis at the celestial sphere;

FIG. 2 illustrates an electrostatic free rotor gyro with torquing circuits, as viewed from above at the equator;

FIG. 4 illustrates a gyro case reversal means;

FIG. 5 illustrates a second embodiment of the invention utilizing the electrostatic gyrocompass mounted on a stable platform;

Figure 3:
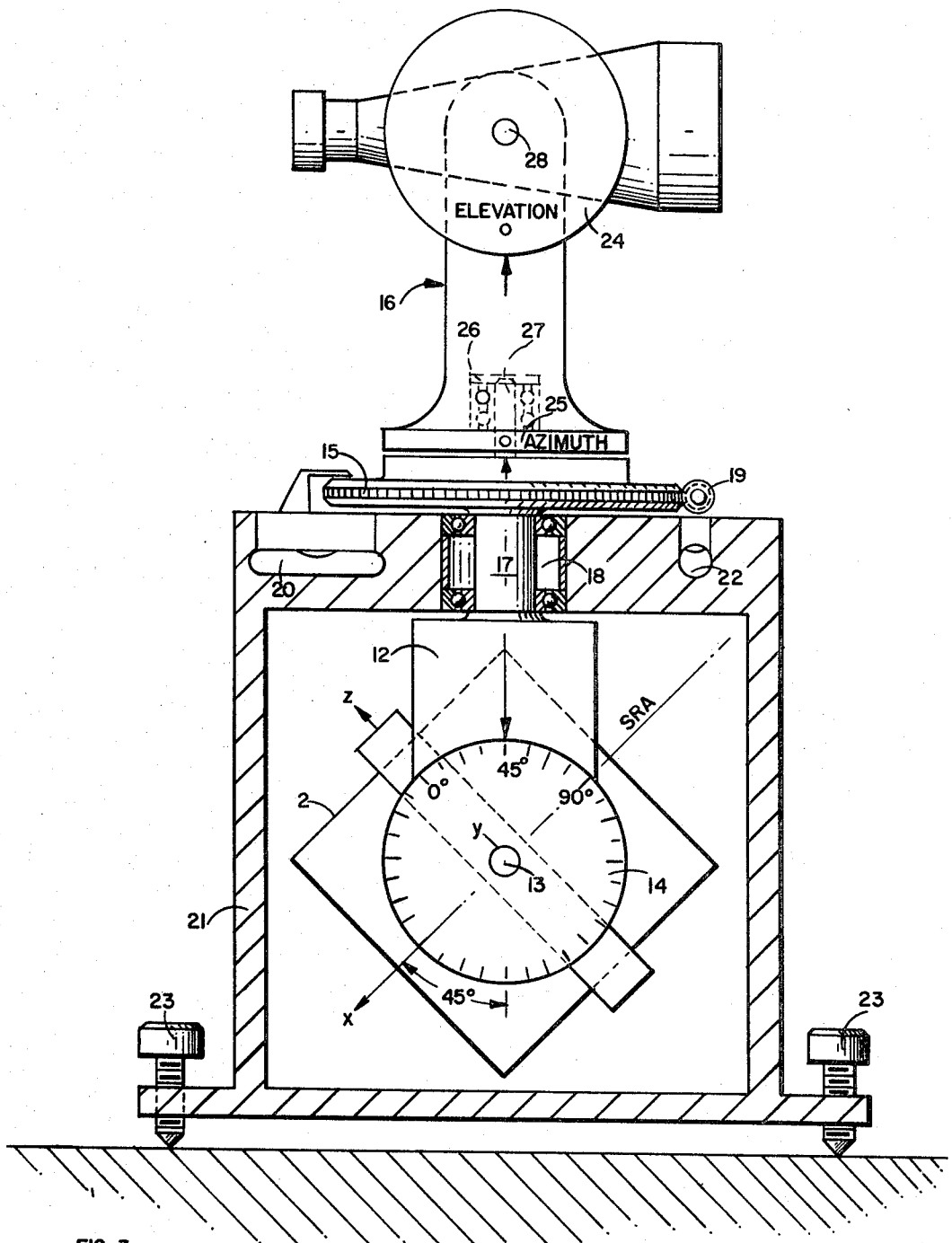
FIG. 3 illustrates a first embodiment of the invention utilizing a theodolite with an azimuth mounted gyro.

The invention is described mainly in connection with a compass used on an earth fixed base, as for azimuth alinement of missiles or for land surveying purposes. However, the principles described apply also to azimuth alinement of inertial guidance platforms and to marine compasses.

A free rotor gyro may be operated as a compass either of the tilt sensing or the torque sensing type.

Principles of operation of the first style of compass may be understood in connection with FIG. 1. Consider a spinning rotor initially set spinning in any arbitrary orientation and supported by a perfect bearing of universal type. The spin axis preserves its initial orientation in space and hence to an observer on the earth the axis describes a circle at the celestial sphere as at $a$ or $b$ in FIG. 1. The motion of the trace of the spin axis at the circumpolar region of the celestial sphere is just like that of a star. In general the axis will exhibit a rate in tilt and also an azimuth rate. If it is in the meridian, the tilt rate is zero; and if its altitude angle is equal to that of the pole, its azimuth rate is zero. If then the spin axis of the rotor is moved until both tilt rate and azimuth rate are zero, it will be alined with the earth's axis.

One practical limitation of such mode of operation is that when the spin axis is close to the pole, the tilt rate is very slow. If it is only a few seconds of arc away from a pole, it may take an hour or more for the tilt to reach a value sensible by a liquid level or other such device, the sensitivity of which is usually not much better than one second of arc.

In the torque sensing mode of operation, the gyro rotor is constrained. The torquing necessary to constrain the rotor to the case current is then taken as a measure of the misalinement. There is no delay as in waiting for an angle to build up to a detectable value. Operation is theoretically nearly instantaneous and in practice is limited only by noise of one kind or another. Theoretically the gyro could be used in any arbitrary orientation, for example with the spin axis vertical or horizontal. However, it is difficult to provide torquers which will match the accuracy of an electrostatic gyro, as would be necessary if large components of earth rotation angular velocity had to be taken care of by torquers. Also, using electromagnetic induction torquers, the spin axis drag can become excessive for large values of torque. Therefore, in this mode of operation, using electromagnetic torquers, it is preferred to arrange matters so that the gyro's spin axis lies substantially parallel to the polar axis, say within less than one degree. The torquers then have to supply only small trimming torques, of a dyne-cm. or less, corresponding to rates of the order of 0.1 deg./hr.

TORQUE SENSING MODE

The torque sensing mode of operation will be described in detail first as it is believed to be the more generally useful one.

Referring to FIG. 2, there is shown schematically an electrostatically supported gyro, of a type well known to those skilled in the art, consisting of a spherical rotor 1 and a case 2 having three pairs of zonal electrodes 3, 4, 5. A motor stator 6 of the polyphase type is arranged to spin the rotor about an axis nominally parallel to the polar axis, operating as an eddy current induction motor. The pairs of electrodes are connected into individual resonant circuits (not shown) such that any radial displacement of the rotor causes the electrostatic attractive force to increase at the larger gap and decrease at the smaller gap. A circuit that may be used to control the spherical rotor 1 is disclosed in U.S. Patent No. 3,098,679, issued July 23, 1963, to W. F. De Boice entitled "Passive Control Circuit for Electrostatic Bearing" and assigned to North American Aviation, Inc. A two-axis pickoff 7 is provided to sense misalinement of the rotor spin axis about the $y$ and $z$ axes relative to the case 2. A pickoff device that may be used with the present invention is disclosed in co-pending application, Ser. No. 158,055, entitled "Induction Pickoff Device," filed Dec. 7, 1961, by J. C. Boltinghouse, et al., now Patent No. 3,226,983, and assigned to North American Aviation, Inc.

The pickoff 7 is mounted on the case 2 in close proximity to the rotor 1; this pickoff includes a magnetic core with an excitation coil 78 wound thereon and two pairs of sensing coils 75 and 77, and 76 with its mate not shown, for picking off the relative motion of the spin axis of rotor 1 with respect to the spin reference axis of case 2 about the $z$ and $y$ axes, respectively. Each sensing coil is wound around a separate pole piece section formed in the magnetic core. The pole piece sections are positioned opposite each other along a sensing axis which is substantially normal to the spin reference axis. The excitation coil 78 is excited by the A-C power source 70. Eddy currents are induced from the excitation coil into the proximate surfaces of the rotor 1. With rotation of the rotor, the sensing coils operate as a linear velocity pickoff, voltages being generated in the coils in accordance with the velocity vector of the rotating conductor relative to the pickoff. With the central axis of the pickoff, which defines the spin reference axis, aligned with the spin axis of the rotor, equal voltages will be generated in each sensing coil of a pair. If these voltages are subtracted, a zero output will result. If, however, the central axis of the pickoff is displaced so that it no longer is aligned with the rotor spin axis, A-C voltages will be generated in the sensing coils for the axis about which the displacement has occurred which when subtractively combined will produce an output signal having a phase and amplitude indicative of the sense and magnitude of the displacement.

A two-axis torquer 30 is provided for application of torques about the $y$ and $z$ axes. The torquer can use the eddy-current drag principle, as disclosed in U.S. Patent No. 3,025,708, issued Mar. 20, 1962, to J. M. Slater, et al., for "Free-Rotor Gyroscope Motor and Torquer Drives" and assigned to North American Aviation, Inc., or the type of torquer disclosed in U.S. Patent No. 2,293,092, issued Aug. 18, 1942, to B. A. Wittkuhns for "Correction Device for Gyroscopes." However, the poles in the present invention are placed very close to the spin reference axis, an arrangement which does not maximize torquer efficiency (which is achieved with poles located 45 degrees from the spin reference axis) but rather minimizes torquer drag about the spin reference axis, which is the preferred condition for the present intended use.

The voltages generated across the sensing coils 75 and 77, indicative of the $z$-axis displacement, are subtracted in algebraic summing amplifier 74 and fed to phase sensitive demodulator 69. Excitation coil 78 is excited with a signal from the A-C power source 70. Power source 70 is also used as the reference for the phase sensitive demodulators 69 and 72. The output of phase sensitive demodulator 69 is fed to the $z$-axis torquer, comprised of coils 9 and 11.

A torquing current meter 12 is inserted into the $z$-axis servo loop to measure the current being supplied to the $z$-axis torquer. An identical servo loop is used on the $y$-axis. This loop consists of the $y$-axis pickoff comprised of sensing coil 76 and its mate which is not shown, algebraic summing amplifier 71, demodulator 72, and torquing current meter 73, and the $y$-axis torquer comprised of coil 10 and its mate which is not shown.

Summarizing, the gyro pickoff 7 provides a signal proportional to the displacement of the spin axis of gyro rotor 1 with respect to the spin reference axis of case 2 about the $y$ and $z$ axes. These signals are amplified and demodulated to provide correcting currents to the gyro torquer 30. These closed loop servos, therefore, provide the components of the restraint on the gyro rotor 1 which force it to precess to follow the case, while the case is rotating in space with the earth. The magnitude and sign of the components are indicated by means of the torquing current meters 12 and 73.

In FIG. 2, the gyro is assumed to be at the equator and the reader is looking down on it from above, the $z$-axis extending vertically out of the paper. It is assumed that the gyro spin reference axis is displaced slightly E of N by an angle $\theta$. A component of earth rotation angular velocity $\Omega_y$ thus appears on the $y$ axis. To make the spin axis precess at the rate the $z$-axis servo must apply a torque of magnitude $L=\Omega_y H$ indicated by the meter 12. If the case 2 is turned about the $z$-axis until the meter 12 reads zero, the $x$-axis will be N, assuming a perfect gyro. If the gyro has a constant or slowly varying bias torque, compensation can be achieved by making a second azimuth reading with the spin of rotor 1 relative to case 2 reversed and splitting the difference, or by making a second reading with the case reversed 180 degrees about the spin reference axis. Which method to use depends on the nature of the bias torque sources.

When the gyro is set in position and operated, there will, in general, be an error torque acting on the gyro rotor (aside from any torque provided by the gyro torquer). This bias torque may be due for example to the action of the earth's magnetic field on the permeable material in the rotor. Unless this bias torque is specifically accounted for, it will cause an error in the determination of direction. If the bias can be measured, its effect can be cancelled either by providing an opposing torque on the rotor or by calculating a correction in the measured direction. It is more expeditious to make two measurements of direction in different ways so that when these measurements are properly combined the effect of bias torque will be eliminated. For example, a modulation of angular momentum will provide for the two different conditions of measurement. Because the gyro precession rate caused by a given bias torque is a function of the angular momentum of the gyro rotor, the indicated direction resulting from each of two rotor speeds may be used to calculate the bias torque and to calculate the true east-west direction. The maximum sensitivity of this method of checking is, of course, provided by a complete reversal of the rotor spin relative to the case.

The same result may be effected by changing the position of the gyro case with respect to the earth through 180 degrees about the rotor spin axis.

With the case in this new position, the reading on torquing current meter 12 is determined. Then, with the case in the first position, the reading on meter 12 is again determined. The true null position of meter 12 is then determined as the mean of these two readings.

For operation at various latitudes the gyro case will be mounted in a trunnion so that the spin reference axis can be tilted to the latitude angle. This will be described in connection with FIG. 3 which shows schematically the structure of a complete gyro theodolite.

The gyro case 2 is supported in a fork 12 by an axle 13 along either the $y$ or $z$ axis. For present purposes, it will be assumed that axle 13 coincides with the $y$ axis. Axle 13 also supports a latitude dial 14 so that the case spin reference axis can be appropriately set, for example, to latitude 45 degrees as shown in FIG. 3. The fork 12 is mounted for rotation relative to the frame 21 by shaft 17 and bearing 18, so that the gyro is supported in what is called an altazimuth mount, the transverse axis, defined by axle 13, being the altitude (or elevation) axis. Liquid levels 20 and 22 are provided for leveling the frame 21. The fork 12 carries a turntable 15 on which is mounted a conventional theodolite 16 with its own altazimuth mount consisting of bearing 26, shaft 27 and axle 28. Theodolite 16 is provided with elevation and azimuth dials 24 and 25, respectively. The scale zero of elevation dial 24 is set at 90° to the telescope axis and is at the reading arrow or index when the telescope axis is parallel to the reference plane of levels 20 and 22. The scale zero of azimuth dial 25 is set at the reading index when the telescope axis is at 90° to axle 13.

In operation, the apparatus is set up solidly on the earth and leveled by adjusting the screws 23. The gyro case spin reference axis is then tilted to the latitude of the station as closely as it is known. With the aid of a magnetic compass or landmarks, the fork 12 is turned either by hand or with an electric motor 19, to bring the spin reference axis as close to the meridian as possible. The electrostatic support circuits are energized, and the gyro motor is energized to accelerate the rotor to operating speed and is then turned off. The torquing circuits are energized. Even though the kind of torquer described in one which dissipates energy, at torque levels of the order of 0.1 deg./hr., the drag is small enough so that the rotor will maintain a useful speed for many hours, assuming that the initial latitude and azimuth settings are reasonably close. If the spin reference axis is not in the meridian, there will be a persistent current in the $z$-axis servo channel. Accordingly, the turntable 15 is moved until the current goes to zero. The spin reference axis of the compass is now in the meridian. If the theodolite elevation and azimuth dials 24 and 25 are set to zero, as shown in FIG. 3, that instrument will be pointing N and level, and bearings can be taken by pointing the theodolite to a desired target and reading the theodolite azimuth dial 25.

The system described can be operated with reversal of the rotor spin direction by making one setting with the gyro running clockwise, noting it, making another setting with the rotor running anti-clockwise, noting that setting, and moving the turntable to a point halfway between.

For use of the case rotation method of compensation, an extra gimbal 33 is provided as shown in FIG. 4. Between readings, the case 2 is turned over 180 degrees as by moving the lug 29 between the stops 32 as is shown.

For use on a fixed base, such as the earth, it is necessary to bring the spin axis to the altitude of the pole. If it is above or below the pole, the azimuth indications are still exact. The only requirement is that the altitude setting be close enough so that the vertical component of earth rotation which is present on misalinement is within the capacity of the torquers. If it is desired to use the compass to measure latitude, adjustment to aline the spin axis with the earth's axis may be made, latitude then being read off the dial 14.

The gyro arrangement of FIG. 2 can be applied to marine gyrocompass use as follows (see FIG. 5): Assume the existence of a high-quality three-axis gyro-stabilized platform maintained level by a Schuler-tuned feedback system. The electrostatic gyro would be mounted on the platform stable element 57 via an altazimuth mount and provided with servomotors 52 and 59 on the altitude and azimuth axes respectively. A gyro-stabilized platform that may be used with the present invention is disclosed in the co-pending application Ser. No. 76,617, entitled "Inertial Navigator Platform," filed Dec. 19, 1960, by H. Newman, et al., now Patent No. 3,163,039 and assigned to North American Aviation, Inc. The electrostatic gyro pickoff 7 is then connected to torquer 30 and to drive the servomotors 52 and 59 to automatically maintain the torquing current at a minimum or zero level, which in turn corresponds to the rotor being substantially aligned to the earth's polar axis. Servo motor 52 is connected by worm-gear 60 to the elevation drive gear 51, which in turn is connected to the gyro case 2. Servo motor 59 is connected through worm-gear 47 to the azimuth drive gear 46, which is turn is connected to the support fork 48, which supports the gyro case 2, with a single degree of freedom about the axis defined by the center of gear 51. The fork 48 is supported for rotation with respect to the platform 57 by shaft 55 and bearings 56. An azimuth pickoff 58, which may be of the conventional "E" type, is supplied to detect any stable-element azimuth error (detected by the pickoff signal between the altazimuth mount and the stable element) which would be attributed to platform error, and the platform gyros would then be torqued (or corrections made elsewhere in the system) to nullify such error.

TILT SENSING MODE

Figure 6:
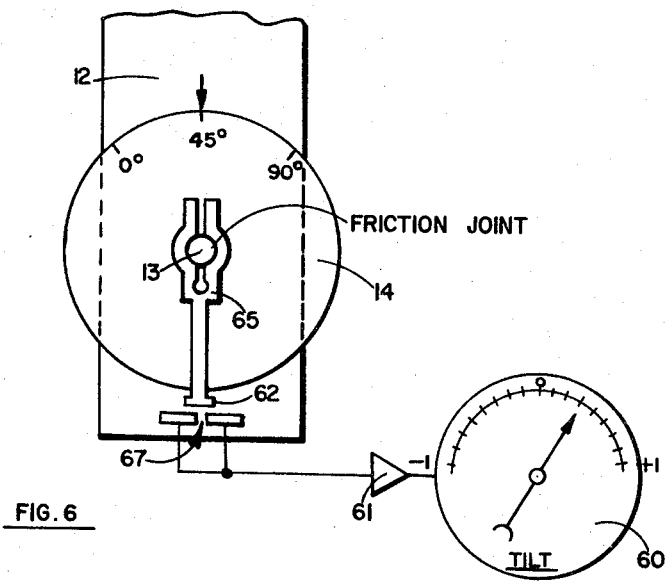
FIG. 6 illustrates a third embodiment of the invention utilizing a latitude-stable tilt detector.

For using the electrostatic gyrocompass in the tilt sensing mode, the altitude axle 13 is provided with a pickoff 67 as shown in FIG. 6. An arm 65 coupled to axle 13 by a friction joint can be moved about the axle 13 of FIG. 3 and set at null at the nominal value of latitude selected. A similar pickoff, not shown, is provided for the azimuth axis. The output from pickoff 67 is sent to an amplifier 61 and then to a meter 60 indicating tilt of the spin reference axis from the preset nominal latitude angle of elevation. A similar meter and amplifier (not shown) are supplied for the azimuth axis. If the spin axis is not along the earth's rotation axis, apparent drifts of the spin axis in elevation and azimuth are observed.

Figure 7:
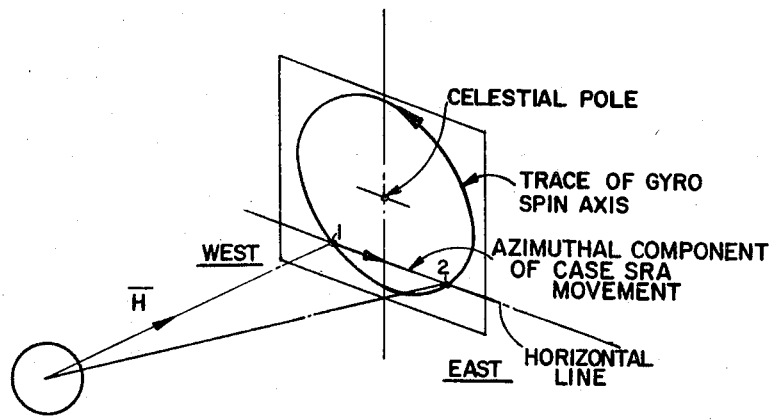
FIG. 7 illustrates the determination of meridian by measurement of azimuth at the instant of equal altitude of the rotor spin axis before and after meridian transit.

Referring to FIG. 7, the gyro may be started up with the spin axis some distance west of north and tilted slightly upward. The spin axis will describe, relative to a fixed horizon, a circular cone about the celestial polar axis as shown. At the point 1 where the spin axis is at an indicated departure less than maximum from the nominal polar axis elevation, an azimuth reading is taken. The spin axis then dips to its lowest position, which may be below the horizon, crosses the meridian and rises again. The azimuth at which the above departure in elevation is again indicated, in the upward swing, is noted (point 2) and the meridian is found as the mean of azimuth readings 1 and 2.

In this mode of use, the degree of freedom in altitude could be omitted. During the interval between 1 and 2, when the spin axis is dipping, no attempt would be made to make it coincide with the case axis. Such a simplification is only possible with an electrostatic gyro where departure of the spin axis from the spin reference axis does not necessarily introduce error as it does in the gas supported variety.

For high accuracy, points 1 and 2 ought to be several hours apart, which would be inconvenient for some applications but not for all, as for example in establishing an accurate baseline at a missile launching site in the Arctic.

The electrostatic gyrocompass may find particular use in such operations as mine surveying where it is required to set up the gyro theodolite at a number of stations relatively close to each other geographically, the whole operation taking a few hours. At present this requires a complete meridian finding operation at each station. It would be desirable if the meridian could be found once for all and then "transported" by making use of some sort of memory expedient. This could, of course, be accomplished with a complete stable platform but at great cost. The electrostatic gyro offers the possibility of achieving the same end more simply. Referring to FIG. 3, the meridian finding operation might be carried out as described, including the extra operation of setting the spin axis exactly along the earth's axis in altitude. The gyro drive motor and the torquer circuits are then disengaged and the gyro theodolite carried from one point to another as by dangling it from a swivel. When set up and leveled, if the rotor has not drifted, a true meridian indication can be obtained without going through the process of finding the earth's axis.

The polar axis oxientation is the only one which would lend itself to the mode of use described. With the spin axis horizontal, for example, it would be necessary to maintain a compensation for earth rate $\Omega_z$ which could not be done unless the gyro were supported on a 3-axis stabilized platform and provided with a high-output torquer.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A gyrocompass comprising, in combination:
   a base adapted to be leveled and set with respect to the surface of the earth;
   an electrostatic gyroscope including a case having a spin reference axis, a rotor having a spin axis, and means for spinning said rotor about said spin axis;
   an altazimuth mount for mounting said case to said base so that said case can be angularly positioned and set with respect to said base with said spin reference axis nominally parallel to the earth's rotation axis, said case being constrained to follow said base and the earth as the earth rotates;
   two-axis pickoff means for generating output signals representative of the displacement of said spin axis with respect to said spin reference axis along two predetermined axes, said displacement and said output signals being a function of the misalignment between said spin reference axis and the earth's rotation axis; and
   torquer means operatively coupled to receive said output signal for providing a torque to said rotor to maintain said spin axis in a state of near alignment with said spin reference axis as said case rotates with the earth.

2. The gyrocompass of claim 1 wherein said torquer means comprises:
   amplifier means connected to receive the outputs of said pickoff means; and
   torquer coils responsive to the output of said amplifier means said torquer coils being connected to torque said rotor rotatively relative to said case.

3. The gyrocompass of claim 2 and further comprising:
   current measuring means electrically connected between said amplifier means and said torquer coils for measuring the currents fed from said amplifier means to said coils so as to provide an indication of the displacement between said spin reference axis and the earth's rotation axis.

4. A gyrocompass comprising, in combination:
   an electrostatic gyroscope including a rotor having a spin axis, a case for supporting said rotor for rotation about said spin axis, said case having a spin reference axis, and means for rotating said rotor about said spin axis;
   a frame adapted to be leveled and set with respect to the surface of the earth;
   a fork mounted to said frame with angular freedom about a substantially vertical axis, said case mounted to said fork with angular freedom about a substantially horizontal axis, said fork and said frame permitting said case to be angular positioned and set with respect to the earth with said spin reference axis nominally parallel to the earth's rotation axis whereby said case is constrained to follow said frame and the earth as the earth rotates;
   pickoff means for detecting the displacement of said spin axis relative to said spin reference axis, said displacement being a function of the misalignment between said spin reference axis and the earth's rotation axis; and
   torquing means operatively coupled to said pickoff means for applying a torque between said case and said rotor to maintain said spin axis in a state of approximative alignment with said spin reference axis as said case rotates with the earth.

5. The gyrocompass of claim 4 further comprising:
   means for measuring the torquing current supplied by said pickoff means to said torquing means so as to provide an indication of the displacement of said spin axis relative to said spin reference axis and the misalignment between said spin reference axis and the earth's rotation axis.

6. The gyrocompass of claim 4 further comprising: servo means connected to said pickoff means and to said frame for driving said frame so as to maintain said spin reference axis substantially parallel to the earth's rotation axis.

References Cited

UNITED STATES PATENTS

| | | | |
|---|---|---|---|
| 2,048,834 | 7/1936 | Young | 33—204 |
| 2,255,899 | 9/1941 | Ross | 33—226 |
| 2,850,905 | 9/1958 | Sedgfield | 74—5.7 |
| 2,972,195 | 2/1961 | Campbell et al. | 33—226 |
| 2,976,618 | 3/1961 | Campbell et al. | 33—226 |
| 3,173,216 | 3/1965 | Johnston | 33—226 |
| 3,209,602 | 10/1965 | Biderman | 74—5 |
| 3,229,376 | 1/1966 | Wilcox | 33—226 |
| 3,253,472 | 5/1966 | Klemes | 33—204 |

FOREIGN PATENTS 129,724   7/1919   Great Britain.

ROBERT B. HULL, *Primary Examiner.*

U.S. Cl. X.R.

33—72